(12) United States Patent
Snodgrass

(10) Patent No.: US 6,291,975 B1
(45) Date of Patent: Sep. 18, 2001

(54) METHOD AND SYSTEM FOR EFFICIENTLY REGULATING POWER SUPPLY VOLTAGES WITH REDUCED PROPAGATION OF POWER TRANSIENTS CAPABLE OF COMMUNICATING INFORMATION

(75) Inventor: Timothy E. Snodgrass, Palo, IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 09/536,650

(22) Filed: Mar. 27, 2000

(51) Int. Cl.$^7$ ........................................................ G05F 3/16
(52) U.S. Cl. .................................................... 323/223
(58) Field of Search ........................... 323/273, 274, 323/282, 284, 223, 224; 363/62

(56) References Cited

U.S. PATENT DOCUMENTS 5,041,777 * 8/1991 Riedger ................................. 323/277
6,057,607 * 5/2000 Rader, III et al. ...................... 307/11

* cited by examiner

*Primary Examiner*—Adolf Deneke Berhane
(74) *Attorney, Agent, or Firm*—Nathan O. Jensen; Kyle Eppele

(57) ABSTRACT

A power supply with a shunt voltage regulator for controlling unwanted emissions of "red" information which includes a feedback loop to reduce input voltages so as to reduce unnecessary power dissipation, where the feedback loop includes a sensed power consumption signal and a low pass filter to remove any "red" information from the sensed power consumption signal.

18 Claims, 1 Drawing Sheet

METHOD AND SYSTEM FOR EFFICIENTLY REGULATING POWER SUPPLY VOLTAGES WITH REDUCED PROPAGATION OF POWER TRANSIENTS CAPABLE OF COMMUNICATING INFORMATION

FIELD OF THE INVENTION

The present invention generally relates to power supplies, and more particularly relates to clean voltage regulators for power supplies, and even more particularly relates to methods and systems for efficiently isolating power transients capable of communicating information through a power supply.

BACKGROUND OF THE INVENTION

In the past, designers of military communication systems have endeavored to enhance security in communication equipment used with classified information. TEMPEST is a U.S. Department of Defense (DOD) program to develop methods of preventing the compromise of government and military information by reducing or eliminating unintended electronic emissions. One approach used in the past to reduce unintended electronic emissions has been to use a constant current shunt voltage regulator to prevent emission of signals on the power lines of communication equipment. While these current shunt regulating power supplies have many advantages, they also have significant drawbacks. "Red" information is used herein to denote information which is classified by the DOD as secret and, therefore, not to be permitted to be communicated to persons other than those having a predetermined clearance to receive such red information. "Black" information is used to denote information which is not classified by the DOD as secret.

Typically, this type of voltage regulator provides a clean source of voltage, but it does it by drawing a constant amount of power from the primary voltage source, irrespective of the immediate power needs. Furthermore, this power level is set so that it exceeds the maximum demanded power level. During normal, non-peak power levels, and during non-classified or non-"red" operations, these prior art shunt regulators dissipate large amounts of unnecessary power in the form of undesirable heat.

Consequently, there exists a need for improved methods and systems for regulating power supplies which have reduced power dissipation and which concomitantly provide for isolation of power transients and their associated undesirable emissions.

SUMMARY OF THE INVENTION

It is an object of the present invention to provide improved efficiency of shunt regulators.

It is a feature of the present invention to utilize a current monitor to provide feedback to adjust shunt regulator input voltages.

It is another feature of the present invention to include a very low pass filter in the feedback loop.

It is an advantage of the present invention to reduce unnecessary power dissipation while maintaining isolation of "red" information.

It is yet another feature of the present invention to include an optical communication path to transmit the feedback across the "red"/"black" boundary.

It is another advantage to reduce the potential of undesirable electro-magnetic emissions pertaining to the information fed back to regulate shunt regulator input voltages.

The present invention is an apparatus and method for efficiently regulating a power supply with reduced emissions, which is designed to satisfy the aforementioned needs, provide the previously stated objects, include the above-listed features, and achieve the already articulated advantages. The present invention is carried out in an "unnecessary power dissipation-less" manner in a sense that the unnecessary dissipation of power in a shunt regulator has been greatly reduced.

Accordingly, the present invention is a power supply shunt regulator which includes a current monitor to feedback information to adjust the shunt regulator input voltage.

BRIEF DESCRIPTION OF THE DRAWINGS

The invention may be more fully understood by reading the following description of the preferred embodiments of the invention, in conjunction with the appended drawings wherein.

DETAILED DESCRIPTION

Figure 1:
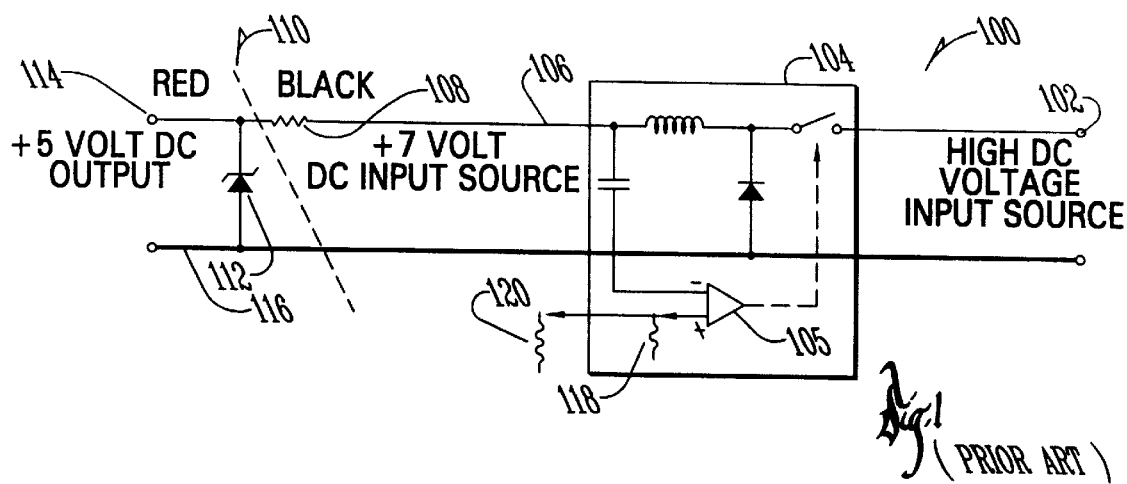
FIG. 1 is a simplified schematic diagram of a shunt regulator of the prior art; the dashed line is included to represent the boundary between "red" and "black" portions of the power supply. The dotted box represents a typical switching down converter.

Now referring to the drawings where like numerals refer to like matter throughout and more particularly, referring to FIG. 1, there is shown a constant current shunt regulator of the prior art, generally designated 100, including a high voltage DC input source 102, and in the dotted lined box, a typical switching down converter 104, and a reduced voltage input source 106, which supplies a constant amount of power through power dissipation resistor 108, across red-black division line 110 to DC output 114, which is coupled through diode 112 to reference voltage line 116. Switching down converter 104 is controlled by variable voltage control 120, which provides a static desired voltage level via variable voltage level line 118 to op-amp 105.

Figure 2:
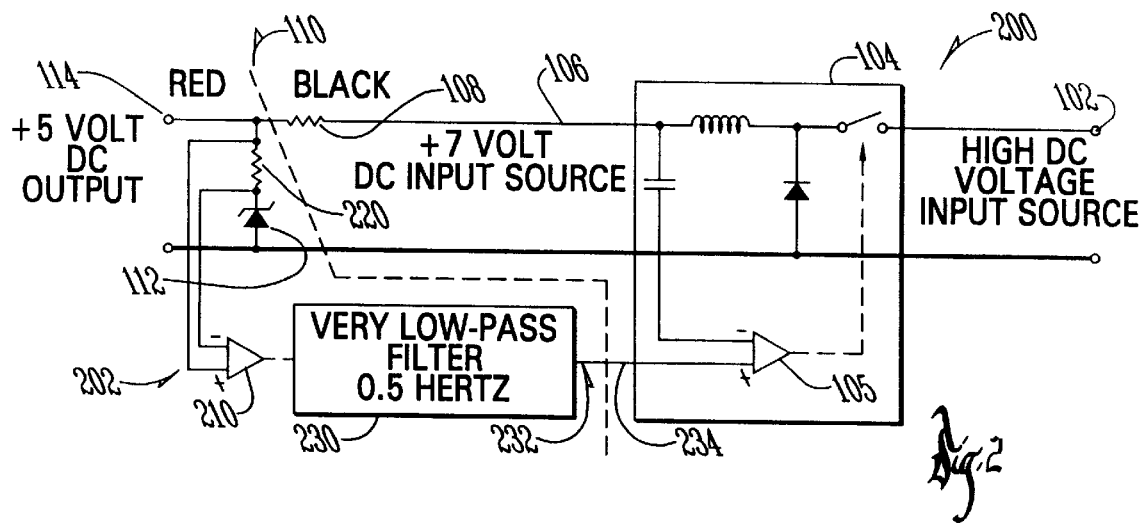
FIG. 2 is a simplified schematic diagram of a shunt regulator of the present invention which includes a current monitor feedback loop; the dashed line is included to represent the boundary between "red" and "black" portions of the power supply.

Now referring to FIG. 2, there is shown an improved shunt regulator of the present invention, generally designated 200, which includes a feedback loop 202, disposed between the diode 112 and the op-amp 105. Feedback loop 202 is used to set the desired voltage to be provided on reduced voltage input source 106 based upon actual power consumption. A current measuring resistor 220 of very small value is disposed between diode 112 and DC output 114 and is used to measure the actual power consumed by the diode on an ongoing basis. The voltage drop across current measuring resistor 220 is sensed and provided to op-amp/comparator 210, which provides a varying signal, representative of the power being consumed, (wasted by the diode), to very low-pass filter 230. The purpose of very low-pass filter 230 is to eliminate the transmission of red information across the red-black division line 110. Very low-pass filter 230 can be any type of very low-pass filter; however, it must relate to the limits of the periodicity of the red information being transmitted by the device consuming the power provided by the shunt regulator 200. For example, the red information may be limited to a particular range of frequencies. If the very low-pass filter 230 has a pass frequency well below the frequencies of red information, then the red information has been successfully filtered from the feedback loop. Engineering trade-offs can be made with respect to the speed of very low-pass filter 230 and the necessary response time of the feedback loop 202. In other words, the performance of very low-pass filter 230 could be fast enough in some applications to compensate for run-time slow variations of power demand, which are unrelated to the red information.

Very low-pass filter 230 generates a feedback signal on feedback output line 232. This feedback signal should be effectively free of all red information. However, as an additional precaution, the feedback signal may be transmitted across the red-black division line 110 using an optical transmitter so as to even further reduce the potential for unwanted electrical coupling. In such cases, an optical transmitter device (not shown) is disposed on feedback output line 232 to convert the signal to an optical signal, which is then transmitted across the red-black division line 110 to an optical receiver device (not shown) on feedback input line 234. Ultimately, the feedback signal is provided to op-amp 105 to adjust the reduced voltage input source 106, so as to greatly reduce the amount of unnecessary power dissipation.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

I claim:

1. A voltage regulator for regulating voltages provided to a device used to process information, the voltage regulator comprising:
   a switching down converter for down converting a high voltage DC input source to a lower reduced voltage input source;
   a power dissipation resistor, coupled to the reduced voltage input source, the power dissipation resistor for dissipating power provided in excess of a power consumption level;
   a current measuring device for measuring the power consumption level and generating a power consumption signal representative of the power being consumed by a shunt regulation device;
   a feedback loop, coupled to said current measuring device, for providing information representative of the power consumption signal to the switching down converter.

2. A voltage regulator of claim 1 wherein said feedback loop includes a low pass filter.

3. A voltage regulator of claim 2 wherein said feedback loop includes an optical transmission means for conveying the information to the switching down converter.

4. A voltage regulator of claim 2 wherein said low pass filter has a cut-off frequency which has a predetermined relationship with a frequency characteristic of information being processed by the device.

5. A voltage regulator of claim 4 wherein the device is a modem.

6. A voltage regulator of claim 5 wherein said information includes information having a predetermined level of classified information.

7. A voltage regulator for regulating voltages provided to a device used to process information, the voltage regulator comprising:
   a switching down converter adapted and configured for down converting a high voltage DC input source to a lower reduced voltage input source;
   a power dissipation resistor, coupled to the reduced voltage input source, the power dissipation resistor adapted and configured for dissipating power provided in excess of a power consumption level;
   a current measuring device adapted and configured for measuring the power consumption level and generating a power consumption signal representative of the power being consumed by a shunt regulation device;
   a feedback loop, coupled to said current measuring device, said feedback loop adapted and configured for providing information representative of the power consumption signal to the switching down converter.

8. A voltage regulator of claim 7 wherein said feedback loop includes a low pass filter.

9. A voltage regulator of claim 8 wherein said feedback loop includes an optical transmission means for conveying the information to the switching down converter.

10. A voltage regulator of claim 8 wherein said low pass filter has a cut-off frequency which has a predetermined relationship with a frequency characteristic of information being processed by the device.

11. A voltage regulator of claim 10 wherein the device is a modem.

12. A voltage regulator of claim 11 wherein said information includes information having a predetermined level of classified information.

13. A voltage regulator for regulating voltages provided to a device used to process information, the voltage regulator comprising:
   means for down converting a high voltage DC input source to a lower reduced voltage input source;
   means for dissipating power in excess of a power consumption level;
   said means for dissipating power being coupled to the reduced voltage input source;
   means for measuring the power consumption level and generating a power consumption signal representative of the power being consumed by a shunt regulation device; and,
   means for providing feedback of information representative of the power consumption signal to the means for down converting.

14. A voltage regulator of claim 13 wherein said means for providing feedback includes a low pass filter.

15. A voltage regulator of claim 14 wherein said means for providing feedback includes an optical transmission means for conveying the information to the means for down converting.

16. A voltage regulator of claim 15 wherein said low pass filter has a cut-off frequency which has a predetermined relationship with a frequency characteristic of information being processed by the device.

17. A voltage regulator of claim 16 wherein the device is a modem.

18. A voltage regulator of claim 17 wherein said information includes information having a predetermined level of classified information.

* * * * *